US012624225B2

(12) United States Patent
Tang et al.

(10) Patent No.: US 12,624,225 B2
(45) Date of Patent: May 12, 2026

(54) ENVIRONMENTAL BARRIER COATING

(71) Applicant: RTX Corporation, Farmington, CT (US)

(72) Inventors: Xia Tang, West Hartford, CT (US); Richard Wesley Jackson, III, Mystic, CT (US); James T. Beals, West Hartford, CT (US); David A. Litton, West Hartford, CT (US); Brian T. Hazel, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 874 days.

(21) Appl. No.: 17/849,129

(22) Filed: Jun. 24, 2022

(65) Prior Publication Data

US 2023/0416538 A1     Dec. 28, 2023

(51) Int. Cl.
　　*B32B 18/00*　　　(2006.01)
　　*C09D 5/08*　　　(2006.01)
(52) U.S. Cl.
　　CPC .................................... C09D 5/084 (2013.01)
(58) Field of Classification Search
　　CPC . B32B 18/00; B32B 2250/04; B32B 2264/00; B32B 2264/10; B32B 2264/107; B32B 2264/12
　　See application file for complete search history.

(56) References Cited

U.S. PATENT DOCUMENTS 11,466,589 B2 * 10/2022 Kracum .................. C04B 41/52
11,821,327 B2 * 11/2023 Kracum .................. F01D 5/288

2013/0136915 A1 5/2013 Naik
2021/0114944 A1 4/2021 Luthra et al.
2021/0189904 A1 6/2021 Kracum et al.

FOREIGN PATENT DOCUMENTS

EP　　　　3838872　　　6/2021
WO　　2016018570　　2/2016

OTHER PUBLICATIONS

International Search Report and Written Opinon for International Patent Application No. PCT/US2023/026126 dated Nov. 20, 2023.
Partial European Search Report for European Patent Application No. 23179616.0 dated Nov. 21, 2023.
International Search Report and Written Opinon for International Patent Application No. PCT/US2023/026126 dated Sep. 29, 2023.
Extended European Search Report for European Patent Application No. 23179616.0 dated Feb. 14, 2024.
International Preliminary Report on Patentability for International Application No. PCT/US2023/026126 mailed Jan. 2, 2025.

* cited by examiner

*Primary Examiner* — Michael J Feely
(74) *Attorney, Agent, or Firm* — Carlson, Gaskey & Olds, P.C.

(57)　　　　ABSTRACT

An article according to an exemplary embodiment of this disclosure, among other possible things includes a substrate and a barrier layer on the substrate. The barrier layer includes a bond coat comprising a matrix, diffusive particles disposed in the matrix, and gettering particles disposed in the matrix; a topcoat; and a porous interlayer disposed between the topcoat and the bond coat. The porous interlayer has a porosity that is greater than a porosity of the topcoat. A slurry composition for applying an interlayer to an article and method of applying a top coat to an article are also disclosed.

16 Claims, 2 Drawing Sheets

400

| PREPARE SLURRY | 402 |

↓

| APPLY SLURRY ONTO THE ARTICLE | 404 |

↓

| DRY/CURE THE SLURRY | 406 |

↓

| SINTER THE INTERLAYER | 408 |

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a substrate and a barrier layer on the substrate. The barrier layer includes a bond coat comprising a matrix, diffusive particles disposed in the matrix, and gettering particles disposed in the matrix; a topcoat; and a porous interlayer disposed between the topcoat and the bond coat. The porous interlayer has a porosity that is greater than a porosity of the topcoat.

In a further example of the foregoing, the porous interlayer and the topcoat include a common material.

In a further example of any of the foregoing, the common material includes at least one of hafnia, hafnium silicate, yttrium mono silicate, yttrium disilicate, ytterbium monosilicate, ytterbium disilicate, yttria stabilized zirconia, gadolinia stabilized zirconia, calcium aluminosilicates, mullite, and barium strontium aluminosilicate, or combinations thereof.

In a further example of any of the foregoing, the topcoat and the porous interlayer include at least one of hafnia, hafnium silicate, yttrium monosilicate, yttrium disilicate, ytterbium monosilicate, ytterbium disilicate, yttria stabilized zirconia, gadolinia stabilized zirconia, calcium aluminosilicates, mullite, and barium strontium aluminosilicate, or combinations thereof.

In a further example of any of the foregoing, a ratio of a thickness of the porous interlayer to a thickness of the top coat is between about 0.5 to about 1.

In a further example of any of the foregoing, a ratio of a thickness of the porous interlayer to a thickness of the bond coat is between about 0.1 and 0.5.

In a further example of any of the foregoing, a porosity of the porous interlayer is between about 5 and 50 percent.

In a further example of any of the foregoing, a porosity of the porous interlayer is about 25 percent.

In a further example of any of the foregoing, a porosity of the top coat is less than about 10 percent.

In a further example of any of the foregoing, the porous interlayer includes pores, and a porosity of the interlayer is between about 5% and about 25%.

In a further example of any of the foregoing, the porous interlayer includes silica.

In a further example of any of the foregoing, the porous interlayer includes more silica than the topcoat.

A slurry composition for applying an interlayer to an article according to an exemplary embodiment of this disclosure, among other possible things includes a carrier fluid, particles of an interlayer material, the particles having a multimodal size distribution wherein at least 50 percent of the particles have a diameter between about 0.5 and about 3 microns (0.02 to 0.1 mils), at least one sintering aid or precursor sintering aid, and at least one dispersant/binder.

In a further example of any of the foregoing, all or substantially all of the particles have a diameter less than about 15 microns (0.6 mils) and greater than about 0.1 microns (0.004 mils).

In a further example of any of the foregoing, the particles include particles of at least one of hafnia, hafnium silicate, yttrium monosilicate, yttrium disilicate, ytterbium monosilicate, ytterbium disilicate, yttria stabilized zirconia, gadolinia stabilized zirconia, calcium aluminosilicates, mullite, and barium strontium aluminosilicate, or combinations thereof.

A method of applying a top coat to an article according to an exemplary embodiment of this disclosure, among other possible things includes providing an article having a bond coat, applying a slurry directly onto the bond coat, the slurry including particles of an interlayer material and at least one sintering aid or sintering aid precursor in a carrier fluid, and sintering the interlayer.

In a further example of the foregoing, the sintering aid includes at least one of silica, alkaline earth aluminosilicates, rare earth aluminosilicates, borosilicates, or combinations thereof.

In a further example of any of the foregoing, the slurry includes silica precursor. The silica precursor transforms to silica prior to or during the sintering step, the silica acting as the sintering aid.

In a further example of any of the foregoing, the slurry includes a dispersant/binder that is an anionic polymer.

In a further example of any of the foregoing, at least 50 percent of the particles have a diameter between about 1 and about 3 microns (0.04 to 0.1 mils).

DETAILED DESCRIPTION

Figure 1:
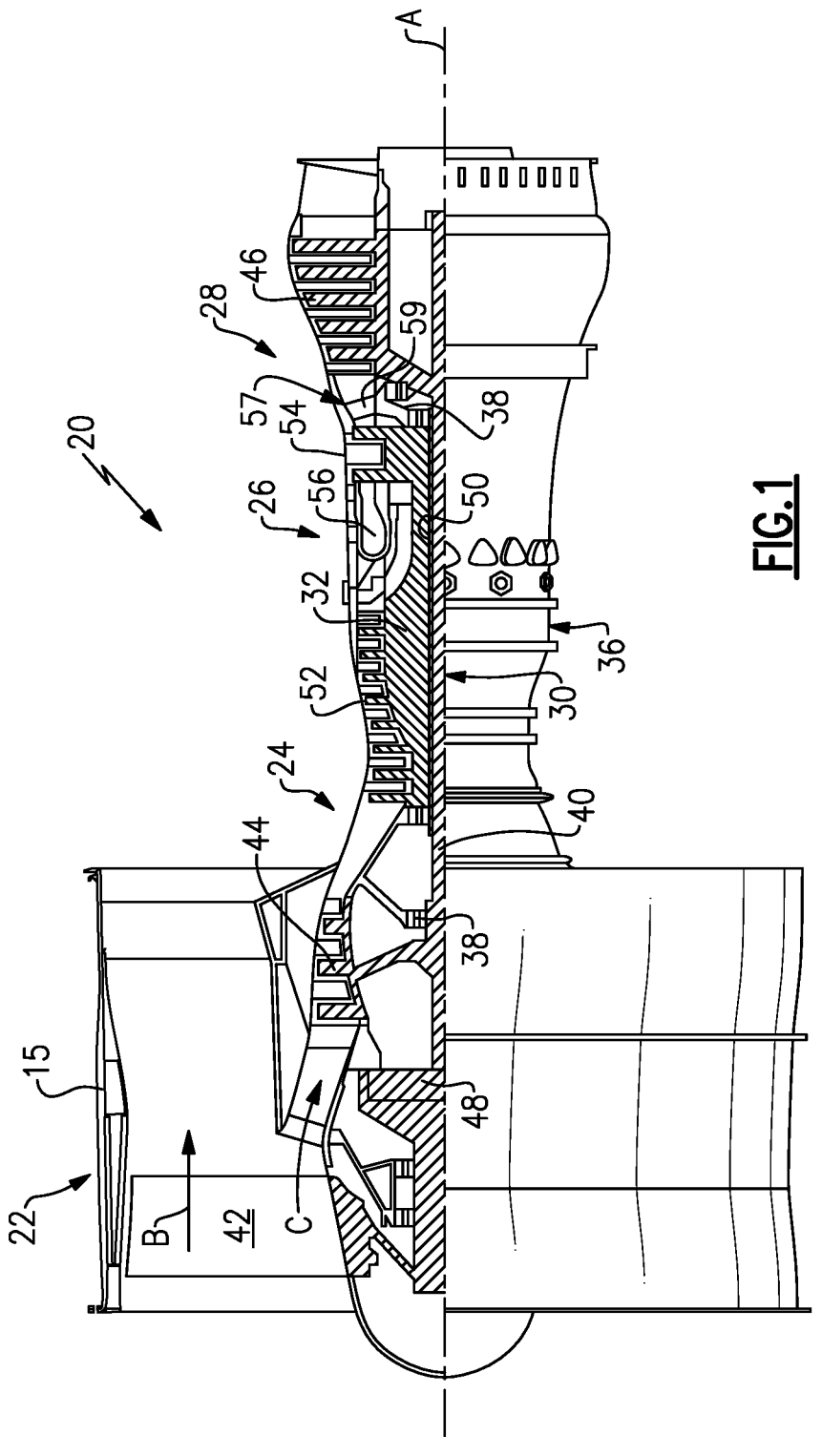
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram ° R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figures 2, 3:
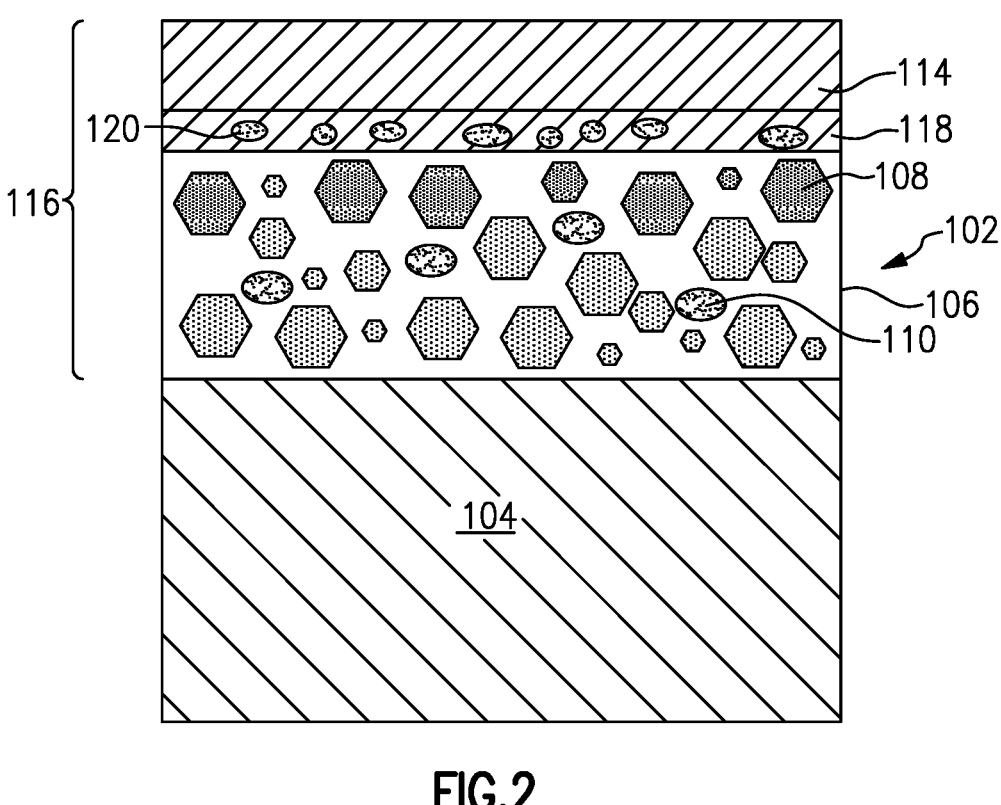
FIG. 2 illustrates an article for the gas turbine engine of claim 1 with a coating.
FIG. 3 schematically illustrates a method of applying the coating of FIG. 2.

FIG. 2 schematically illustrates a representative portion of an example article 100 for the gas turbine engine 20 that includes a composite material bond coat 102 that acts as a barrier layer. The article 100 can be, for example, an airfoil in the compressor section 24 or turbine section 28, a combustor liner panel in the combustor section 26, a blade outer air seal, or other component that would benefit from the examples herein. In this example, the bond coat 102 is used as an environmental barrier layer to protect an underlying substrate 104 from environmental conditions, as well as thermal conditions. As will be appreciated, the bond coat 102 can be used as a stand-alone barrier layer, as an outermost/top coat with additional underlying layers, or in combination with other coating under- or over-layers, such as, but not limited to, ceramic-based topcoats.

The bond coat 102 includes a matrix 106, a dispersion of "gettering" particles 108, and a dispersion of diffusive particles 110. The matrix 106 may be silicon dioxide ($SiO_2$), in one example. In one example, the gettering particles 108 are silicon oxycarbide particles (SiOC) or silicide particles such as molybdenum disilicide ($MoSi_2$) particles 108, though other examples are contemplated. The gettering particles 108 could be, for instance, molybdenum disilicide particles, tungsten disilicide particles, vanadium disilicide particles, niobium disilicide particles, silicon oxycarbide particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, barium magnesium alumino-silicate (BMAS) particles, barium strontium aluminum silicate particles, magnesium silicate particles, calcium aluminosilicate particles (CAS), alkaline earth aluminum silicate particles, yttrium aluminum silicate particles, ytterbium aluminum silicate particles, other rare earth metal aluminum silicate particles, or combinations thereof.

The bond coat 102 protects the underlying substrate 104 from oxygen and moisture. For example, the substrate 104 can be a ceramic-based substrate, such as a silicon-containing ceramic material. One example is silicon carbide. Another non-limiting example is silicon nitride. Ceramic matrix composite (CMC) substrates 104 such as silicon carbide fibers in a silicon carbide matrix are also contemplated. These CMC substrates can be formed by melt infiltration, chemical vapor infiltration (CVI), polymer infiltration and pyrolysis (PIP), particulate infiltration, or any other known method.

The gettering particles 108 and the diffusive particles 110 function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant species, such as oxygen or water that could diffuse into the bond coat 102. In this way, the gettering particles 108 could reduce the likelihood of those oxidant species reaching and oxidizing the substrate 104.

The bond coat 102 can be applied by any known method, such as a slurry coating method similar to the method describe herein.

A ceramic-based top coat 114 is interfaced directly with the bond coat 102. As an example, the ceramic-based top coat 114 can include one or more layers of an oxide-based material. The oxide-based material can be, for instance, hafnium-based oxides or yttrium-based oxides (such as hafnia, hafnium silicate, yttrium monosilicate, yttrium disilicate, ytterbium monosilicate, ytterbium disilicate, yttria stabilized zirconia, gadolinia stabilized zirconia, calcium aluminosilicates, mullite, and barium strontium aluminosilicate, or combinations thereof.), calcium aluminosilicates, mullite, barium strontium aluminosilicate, other rare earth silicates, or combinations thereof, but is not limited to such oxides.

The top coat 114 and bond coat 102 together form a barrier coating 116 for the substrate 104. The top coat 114 is the outermost layer of the barrier coating 116, and is exposed to the elements when the article 100 is in use.

When the article 100 having the barrier coating 116 is in use, such as during operation of engine 20, the gettering particles 108 react with oxidants as discussed above. The reaction products of these reactions may include gases which can accumulate at the interface of the bond coat 102 and top coat 114. This accumulation can cause blistering or delamination of the top coat 114.

Additionally, in some examples, the gettering particles 108 are relatively large compared to the thickness of the bond coat 102, resulting in a high surface roughness for the bond coat 102. For instance, an average diameter of the gettering particles 108 can be on the order of about 10% of the thickness of the bond coat 102.

Accordingly, a porous interlayer 118 is disposed between the bond coat 102 and the top coat 114 as part of the barrier coating 116. Pores 120 within the porous interlayer 118 provide a space for the gaseous reaction products of the gettering particles 108 with oxidants as discussed above to reside in the porous interlayer 118 so as not to disturb the top coat 114.

The pores 120 in the porous interlayer 118 may also mitigate volumetric expansion of the bond coat 102, which can be associated with the transformation of gettering particle 108 material into oxide material after reaction with oxidants as discussed above. This is due to the larger molar volume of some oxides as compared to the gettering particle 108 material. For instance, silicon carbide gettering particles 108 react with oxidants to form silicon dioxide (and carbon monoxide gas). The molar volume of silicon dioxide is greater than that of silicon carbide. The porous interlayer 118 can accommodate this volumetric expansion of gettering particles 108 in the bond coat 102, by providing space for the volume product to flow into without disturbing the top coat 114.

Additionally, the porosity of the interlayer 120 promotes adhesion of both the bond coat 102 and the top coat 114 to the interlayer 118 by allowing for material infiltration, or interlocking, between material of the bond coat 102/top coat 114 into the pores 120 of the interlayer 118. This in turn provides improved compliance and recession resistance to the barrier layer 116 which improves its overall lifetime. Moreover, the improved adhesion of the top coat 114 within the barrier layer 116 enables the use of a thinner top coat 114 which reduces the cost and weight of the article 100. For instance, the top coat 114 may be between about 1 and about 6 mils (0.0254 and 0.1524 mm) thick.

In one example, a ratio of a thickness of the porous interlayer 118 to the thickness of the top coat 114 is between about 0.5 to about 1.

In one example, a ratio of a thickness of the porous interlayer 118 to the thickness of the bond coat 102 is between about 0.1 and about 0.5.

The porous interlayer 118 is more porous than the top coat 114. In one example, the porosity of the porous interlayer 118 is between about 5 and about 50%. In a further example, the porosity of the porous interlayer is between about 5 and about 25%. In a further example, the porosity of the porous interlayer is about 25%. In general, the porosity of the top coat 114 is less than about 10%.

In one example, the diameter of the pores 120 is between about 0.5 to about 1 micron (0.02 to 0.04 mils).

In one example, the porous interlayer 118 comprises the same material as the topcoat 114, e.g., rare earth silicates as discussed above. In another example, the porous interlayer 118 may comprise a different material than the top coat 114 selected from the group of topcoat 114 suitable materials discussed above. In general, the chemical similarity between the topcoat 114 and the interlayer 118 promotes chemical interactions between the two layers, and thus promotes adhesion of the top coat 114 to the interlayer 118.

FIG. 3 schematically illustrates a method 400 of applying the interlayer 118 by a slurry coating process. In step 402, a slurry comprising interlayer 118 constituents in a carrier fluid is prepared. The constituents include particles of interlayer 118 material, such as hafnium silicate particles, other rate earth silicate particles, or particles of any of the example materials discussed above. In one example, the particles are in a crystalline form and generally do not undergo phase transformation during subsequent method steps. That is, the particles can withstand the processing conditions required to cure/sinter the interlayer 118, discussed in more detail below, without degrading or changing phase.

The carrier fluid can be water or ethanol. The slurry may also contain a dispersant or binder that is soluble in the carrier fluid. For instance, the dispersant/binder can be an anionic polymer. Other dispersants and binders are well known in the art.

The slurry also includes one or more sintering aids, such as silica, or silica precursors like silicon, silicon carbide, or silicon dioxide, silica, aluminosilicates such as alkaline earth aluminosilicates or rare earth aluminosilicates and borosilicates. The silica precursors react with other constituents in the slurry to form silica prior to or during the sintering step discussed below. In some examples, the sintering aids or silica precursors comprise up to about 20% by weight of the slurry. In further examples, the sintering aids or silica precursors comprise less than about 5% by weight of the slurry. After the sintering steps discussed below, the interlayer 118 has a higher concentration of silica than the topcoat 114.

The sintering aids/silica precursors lower the temperature required to sinter and densify the interlayer 118 in subsequent method steps discussed below. Moreover, silica tends to coat the rough surface of the bond coat 102, promoting adhesion of the interlayer 118 to the bond coat 102. Likewise silica in the interlayer 118 can promote adhesion of the top coat 114 to the interlayer 118.

The particles of the interlayer 118 material have a multimodal particle size distribution. In one example, the majority of the particles (e.g., at least 50%) have a diameter between about 0.5 and about 3 microns (0.02 to 0.1 mils). All or substantially all of the particles (e.g., about 100%) have a diameter less than about 15 microns (0.6 mils) and greater than about microns (0.004 mils). The multimodal distribution improves packing of the particles of the interlayer 118 when the slurry is applied, resulting in a uniform interlayer and reducing the capacity for shrinkage during subsequent method steps.

In step 404, the slurry is applied to the article 100 directly onto the bond coat 102. In one example, the slurry is in the form of a thick paste (e.g., the slurry has a high viscosity and high solids load). For instance, the solids load may be greater than about 45% by volume. In further examples, the solids load is greater than about 60% by volume. The slurry can be applied manually or by a robot. In another example, the slurry has a lower viscosity suitable for spraying, painting, or dipping, and is applied by one of these methods.

In optional step 406, the slurry is dried and/or cured. The drying/curing generally allows some of the carrier liquid in the slurry to evaporate to improve handling of the article 100 for the sintering step discussed below. For instance, the drying/curing can be performed at relatively low temperatures e.g., between about room temperature and 200 degrees C. (392 degrees F.).

In some examples, step 404 and optional step 406 are repeated prior the sintering step 308 discussed below to create a multi-layer interlayer 118.

In step 408, the interlayer 118 is sintered. The sintering occurs at about 2400-2750 degrees F. (1315 C-1525 degrees C.).

In one example, the method 400 is performed after application of the bond coat 102 but before sintering of the bond coat 102. Thus the sintering step 408 results in co-sintering of the bond coat 102 and interlayer 118. Similarly, the topcoat 114 can be applied after step 404 and optional step 406 but before the sintering step 408, resulting in co-sintering of the topcoat 114 and the interlayer 118, and/or the bond coat 102.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article, comprising:
a substrate; and
a barrier layer on the substrate, the barrier layer including:
    a bond coat comprising a matrix, diffusive particles disposed in the matrix, and gettering particles disposed in the matrix,
    a topcoat, and
    a porous interlayer disposed between the topcoat and the bond coat, the porous interlayer having a porosity that is greater than a porosity of the topcoat:
    wherein the topcoat and the porous interlayer include at least one of hafnia, hafnium silicate, yttrium monosilicate, yttrium disilicate, ytterbium monosilicate, ytterbium disilicate, yttria stabilized zirconia, gadolinia stabilized zirconia, calcium aluminosilicates, mullite, and barium strontium aluminosilicate.

2. The article of claim 1, wherein the porous interlayer and the topcoat include a common material.

3. The article of claim 2, wherein the common material includes at least one of hafnia, hafnium silicate, yttrium monosilicate, yttrium disilicate, ytterbium monosilicate, ytterbium disilicate, yttria stabilized zirconia, gadolinia stabilized zirconia, calcium aluminosilicates, mullite, and barium strontium aluminosilicate.

4. The article of claim 2, wherein the common material includes at least one of hafnia and hafnium silicate.

5. The article of claim 2, wherein the common material includes at least one of yttrium monosilicate and yttrium disilicate.

6. The article of claim 2, wherein the common material includes at least one of ytterbium monosilicate and ytterbium disilicate.

7. The article of claim 2, wherein the common material includes at least one of yttria stabilized zirconia and gadolinia stabilized zirconia.

8. The article of claim 2, wherein the common material includes at least one of calcium aluminosilicates and mullite.

9. The article of claim 1, wherein a ratio of a thickness of the porous interlayer to a thickness of the top coat is between about 0.5 to about 1.

10. The article of claim 1, wherein a ratio of a thickness of the porous interlayer to a thickness of the bond coat is between about 0.1 and 0.5.

11. The article of claim 1, wherein a porosity of the porous interlayer is between about 5 and 50 percent.

12. The article of claim 11, wherein a porosity of the porous interlayer is about 25 percent.

13. The article of claim 11, wherein a porosity of the top coat is less than about 10 percent.

14. The article of claim 1, wherein the porous interlayer includes pores, and wherein a porosity of the interlayer is between about 5% and about 25%.

15. The article of claim 1, wherein the porous interlayer includes silica.

16. The article of claim 15, wherein the porous interlayer includes more silica than the topcoat.

\* \* \* \* \*